United States Patent
Thorn et al.

(10) Patent No.: US 6,442,979 B1
(45) Date of Patent: Sep. 3, 2002

(54) WASHING MACHINE MOTOR CONTROL DEVICE AND METHOD

(75) Inventors: J. Stephen Thorn, Florissant; Arthur E. Woodward, Manchester; Ralph D. Furmanek, Ballwin, all of MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/306,613

(22) Filed: May 6, 1999

(51) Int. Cl.⁷ .................................................. D06F 33/02
(52) U.S. Cl. ...................... 68/12.16; 68/12.06; 318/807
(58) Field of Search ............................... 68/12.16, 12.06, 68/133; 8/159; 318/811, 803, 807

(56) References Cited

U.S. PATENT DOCUMENTS

| | | | |
|---|---|---|---|
| 3,792,297 A | | 2/1974 | Torok ........................ 310/183 |
| 4,249,120 A | * | 2/1981 | Earle |
| 4,331,994 A | * | 5/1982 | Wirth |
| 4,408,150 A | | 10/1983 | Holston et al. ............. 318/779 |
| 4,420,718 A | * | 12/1983 | Sakai et al. |
| 4,490,780 A | * | 12/1984 | Nondahl |
| 4,511,834 A | * | 4/1985 | Studtmann |
| 4,521,840 A | * | 6/1985 | Hoadley |
| 4,528,485 A | | 7/1985 | Boyd, Jr. .................... 318/138 |
| 4,575,668 A | * | 3/1986 | Baker |
| 4,633,157 A | * | 12/1986 | Streater |
| 4,663,578 A | * | 5/1987 | Iwasaki et al. |
| 4,958,269 A | | 9/1990 | Gritter |
| 4,986,092 A | * | 1/1991 | Sood et al. ................. 68/12.01 |
| 4,987,351 A | | 1/1991 | Disser et al. ................. 318/78 |
| 5,034,875 A | * | 7/1991 | Araki |
| 5,045,988 A | * | 9/1991 | Gritter et al. |
| 5,070,565 A | | 12/1991 | Sood et al. ..................... 8/159 |
| 5,079,494 A | * | 1/1992 | Reichard |
| 5,206,575 A | * | 4/1993 | Nakamura et al. |
| B14,408,150 A | | 12/1993 | Holston et al. ............. 318/779 |
| 5,291,106 A | * | 3/1994 | Murty et al. |
| 5,367,240 A | * | 11/1994 | Brumloop et al. |
| 5,420,492 A | * | 5/1995 | Sood et al. |
| 5,543,698 A | * | 8/1996 | Tao et al. |
| 5,631,813 A | * | 5/1997 | Ikeshita et al. |
| 5,712,456 A | * | 1/1998 | McCarthy et al. |
| 5,764,023 A | * | 6/1998 | Wieloch |
| 5,808,882 A | * | 9/1998 | Mochikawa |
| 6,097,171 A | * | 8/2000 | Branecky |

FOREIGN PATENT DOCUMENTS

| | | | |
|---|---|---|---|
| EP | 0 082 828 A1 | 6/1983 | ........... D06F/37/30 |
| EP | 0 392 962 A | 10/1990 | ........... D06F/37/30 |
| EP | 0 394 178 A | 10/1990 | ........... D06F/37/30 |
| JP | 59-63982 | * 4/1984 | |

* cited by examiner

Primary Examiner—Frankie L. Stinson
(74) Attorney, Agent, or Firm—Howrey Simon Arnold & White LLP

(57) ABSTRACT

A method and device for driving a clothes washing machine motor at a predetermined speed is presented. The washing machine motor, which may be an AC induction motor, is powered by a DC to AC inverter that includes a DC bus. The DC bus current is measured and the inverter output frequency is adjusted in response to the DC bus current measurement. In exemplary embodiments, measuring the DC bus current includes measuring the voltage drop across a resistor coupled to the DC bus. The frequency adjustment may be calculated by multiplying the DC bus current by a compensation factor to calculate a frequency adjustment value. Alternatively, frequency adjustment values may be stored in a look-up table, and the measured DC bus current is used to index the look-up table.

16 Claims, 2 Drawing Sheets

WASHING MACHINE MOTOR CONTROL DEVICE AND METHOD

BACKGROUND OF THE INVENTION

1. Field of the Invention

The invention relates generally to electric motor control, and more specifically, to operating a clothes washing machine powered by an induction motor at a desired speed.

2. Description of Related Art

Residential and commercial clothes washing machines are well known. A generally cylindrical tub or basket for holding the clothing and other articles to be washed is rotatably mounted within a cabinet. Typically, an electric motor drives the basket. During a wash cycle, a cleaning solution of water and detergent or soap is forced through the clothes to wash them. The solution is rinsed from the clothes with water, then, during one or more spin cycles, the water is extracted from the clothes by spinning the basket.

One way of categorizing washing machines is by the orientation of the washing machine basket. A conventional vertical-axis washing machine includes a perforated wash basket arranged to spin about a generally vertical axis. The wash basket is disposed within a vertically aligned tub, and an agitator is situated in the wash basket. Articles to be washed are loaded into the basket through a door, which is usually situated on the top of the washing machine. The tub is filled with the detergent and water solution, and oscillation of the agitator moves the clothes in the solution. A motor typically drives the agitator, in addition to spinning the vertically-oriented basket during spin cycles. A series of gears or belts are commonly configured to drive the proper component at the proper time during each washing machine cycle.

In other vertical-axis washing machine configurations, articles to be washed are moved within the cleaning solution by means other than an agitator. For example, a system disclosed in U.S. Pat. No. 5,271,251 uses a series of inwardly directed baffles. In association with the baffles, ramps on the bottom wall of the basket cause the articles within the basket to move up the side of the basket wall and to slide along the baffles in a swirling motion as the basket is turned by the motor. In another vertical-axis washing machine that is described in U.S. Pat. No. 5,460,018, the agitator is eliminated by use of a "wobble" plate that is disposed within the lower portion of the wash basket and mounted for wobbling motion. The motor is selectively interconnected with the basket and bottom plate for rotating the basket and the bottom plate together and for wobbling the bottom plate relative to the wash basket while the basket is held stationary such that the clothes items are "bounced" in and out of the cleaning solution within the wash basket.

Horizontal-axis washing machines, having the basket oriented to spin about an essentially horizontal axis, also do not include an agitator, and a variable-speed motor is typically used to drive the basket. During wash cycles, the basket of the horizontal-axis washing machines rotates at a relatively low speed. The rotation speed of the basket is such that clothes are lifted up out of the water, using baffles distributed about the basket, then dropped back into the water as the basket revolves. During a "distribution" cycle, the horizontally-oriented basket rotation speed is gradually increased, until the clothes begin to "stick" to the sides of the basket due to centrifugal force, thereby distributing the clothes about the sides of the basket. Once the clothes have been distributed about the basket, the speed is further increased to extract the water from the clothes.

Driving the wash basket at predetermined speeds is necessary in many washing machine configurations. For instance, both vertical and horizontal-axis washing machines extract water from clothes by spinning the basket, such that centrifugal force extracts the water from the clothes. It is desirable to spin the basket at a high speed and extract the maximum amount of water from the clothes in the shortest possible time, thus saving time and energy. In vertical-axis machines without agitators, such as the wobble plate configuration, if the speed is too slow, the wash action may not be sufficient. Conversely, if the speed is too fast, the clothes may tangle. In horizontal-axis machines, if the basket is rotated too slowly, the clothes will not lift out of the water, and if the basket rotates too fast, the clothes will "stick" to the sides of the basket and not tumble into the cleaning solution. Thus, precise speed control is important for a washing machine to perform its function of getting clothes clean. Unfortunately, precise speed control mechanisms are often complicated and expensive.

Single phase AC induction motors are commonly used in washing machine applications. AC induction motors are popular for several reasons, including high robustness, reliability, low price and good efficiency. However, an induction motor's speed slips relative to synchronous speed as the load increases. This could be unacceptable, since it may be important to maintain, or even increase, the wash basket speed as the load increases. For instance, it may be necessary to spin a large load of clothes faster than a small load to remove as much water as possible. In a vertical-axis machine employing a wobble plate to agitate the clothes, it may be necessary to drive the wobble plate faster for large loads to move the clothes in and out of the cleaning solution as desired. Similarly, in a horizontal-axis machine's wash cycle, it may be necessary to rotate the basket faster with a large load so that the clothes lift up out of the cleaning solution.

For variable speed applications, three-phase AC induction motors are often used. They are typically powered by a three-phase pulse-width modulated (PWM) inverter. The desired speeds are achieved by setting the excitation frequency; however, the motor speed still slips relative to the excitation frequency as the load increases.

Expensive, nearly synchronous motors are generally inappropriate for the cost-sensitive appliance market. Tachometer feedback closed-loop speed control is used in some washing machine applications, although the tachometer hardware adds unwanted costs to the system. In other systems, the inverter output voltage is varied in response to increased loads to affect slip and maintain the desired speed. Varying inverter output voltage complicates system implementation, is constrained in speed increment by the output frequency, and risks pullout due to transient loads in low volts/hertz situations.

Hence, a need exists for improved speed control in induction motor-driven washing machines. However, implementing such controls is difficult in clothes washing machine applications, since, among other things, the load varies greatly due to varying amounts of clothes and water in the machine. The present invention addresses shortcomings associated with the prior art.

SUMMARY OF THE INVENTION

In one aspect of the present invention, a method of driving a clothes washing machine motor at a predetermined speed is presented. The washing machine motor is powered by a DC to AC inverter that includes a DC bus, and the method includes measuring the DC bus current and adjusting the inverter output frequency in response to the DC bus current measurement. In exemplary embodiments, measuring the DC bus current includes measuring the voltage drop across a resistor coupled to the DC bus. The frequency adjustment may be calculated by multiplying the DC bus current by a compensation factor to calculate a frequency adjustment value. Alternatively, frequency adjustment values may be stored in a look-up table, and the measured DC bus current is used to index the look-up table.

In accordance with other aspects of the present invention, a clothes washing machine motor control system includes a DC voltage source including a DC bus and an inverter including a plurality of switches coupled to the DC bus. The switches are arranged to selectively couple phase windings of a washing machine motor to the DC bus. A controller is coupled to the DC bus and to the inverter, with the controller being operable to drive the switches so as to provide pulse-width modulated sine wave voltages to the phase windings. The controller receives an indication of the DC bus current and, in response thereto, adjusts the inverter output frequency.

In accordance with further aspects of the present invention, a clothes washing machine system includes a cabinet, a tub rotatably mounted within the cabinet, and a motor including a plurality of phase windings therein. The motor is operably coupled to the tub for rotating the tub within the cabinet. A DC voltage source includes a DC bus, and an inverter that includes a plurality of switches is coupled to the DC bus, with the switches arranged to selectively couple the phase windings to the DC bus. A controller is coupled to the DC bus and to the inverter, with the controller being operable to drive the switches so as to provide pulse-width modulated sine wave voltages to the phase windings. The controller receives an indication of the DC bus current and in response thereto, adjusts the inverter output frequency. The washing machine may be either a vertical-axis machine, with the washing machine tub mounted within the cabinet so as to rotate about a generally vertical axis, or a horizontal-axis machine, with the washing machine tub mounted within the cabinet so as to rotate about a generally horizontal axis.

According to still further aspects of the invention, a program storage device includes instructions that when executed, perform a method of driving a washing machine motor at a desired speed. The washing machine motor is powered by a DC to AC inverter that includes a DC bus. The method includes receiving an indication of the DC bus current, and determining an adjustment to the inverter output frequency in response to the indication of the DC bus current. In specific embodiments, the voltage to frequency ratio of the inverter output is kept essentially constant.

BRIEF DESCRIPTION OF THE DRAWINGS

Other objects and advantages of the invention will become apparent upon reading the following detailed description and upon reference to the drawings in which.

Figure 2:
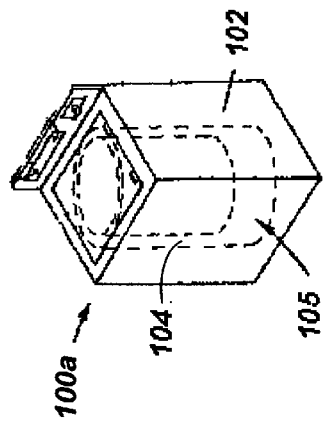
FIG. 2 illustrates a vertical-axis washing machine in accordance with embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
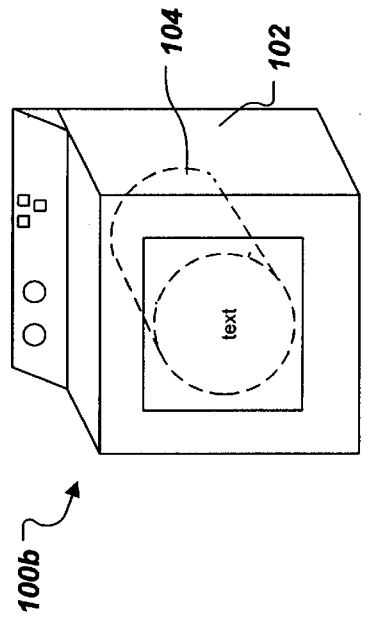
FIG. 3 illustrates a horizontal-axis washing machine in accordance with embodiments of the present invention.
Figure 1:
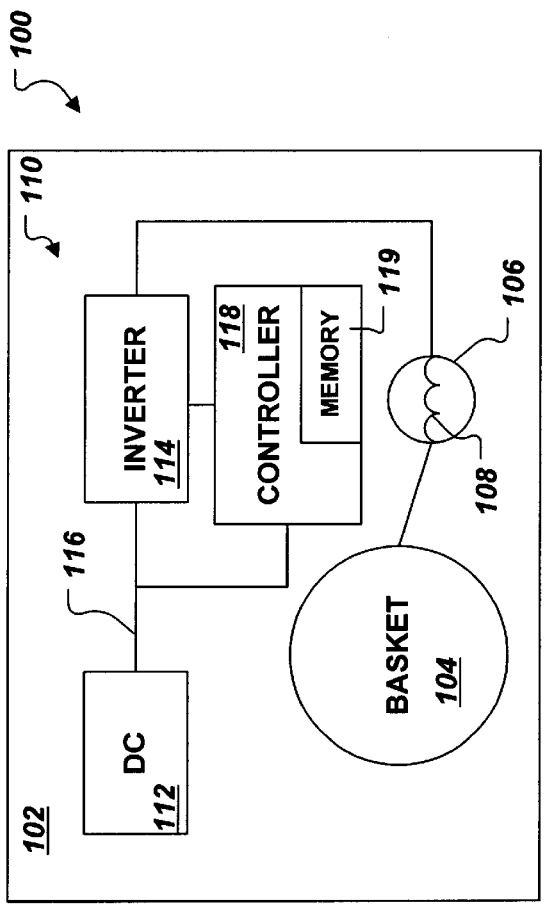
FIG. 1 is a block diagram conceptually illustrating a clothes washing machine system in accordance with an embodiment of the present invention.

FIG. 1 is a block diagram, schematically illustrating a washing machine 100 in accordance with an embodiment of the present invention. The washing machine 100 includes a cabinet 102, in which a wash basket 104 is rotatably mounted. The wash basket 104 may be situated within a wash tub 105 (not shown in FIG. 1). The washing machine 100 may be either a vertical or horizontal-axis washing machine. FIG. 2 illustrates a vertical-axis washing machine 100a in accordance with embodiments of the invention, and FIG. 3 illustrates a horizontal-axis washing machine 100b in accordance with other embodiments.

A motor 106, which includes a plurality of phase windings 108, is operably coupled to the basket 104 so as to rotate the basket within the cabinet 102. In one embodiment of the invention, the motor 106 comprises a three-phase induction motor that includes a stator and a rotor mounted to rotate relative to the stator. The phase windings are distributed around the stator to produce a roughly sinusoidal distribution.

A motor control system is generally indicated by reference 110. A DC power source 112 is coupled to a DC-AC inverter 114 via a DC bus 116. In the embodiment illustrated, the inverter provides PWM three-phase sine wave voltages to the phase windings 108 at a desired voltage and frequency to generate a rotating magnetic field. A controller 118 is coupled to receive an indication of the DC bus current, and in response thereto, adjust the output frequency of the inverter 114. In exemplary embodiments of the invention, the controller 118 includes a memory 119 that stores the software code required to execute the various control methods disclosed herein. An example of a suitable controller is a Motorola MC68HC705MC4.

Figure 4:
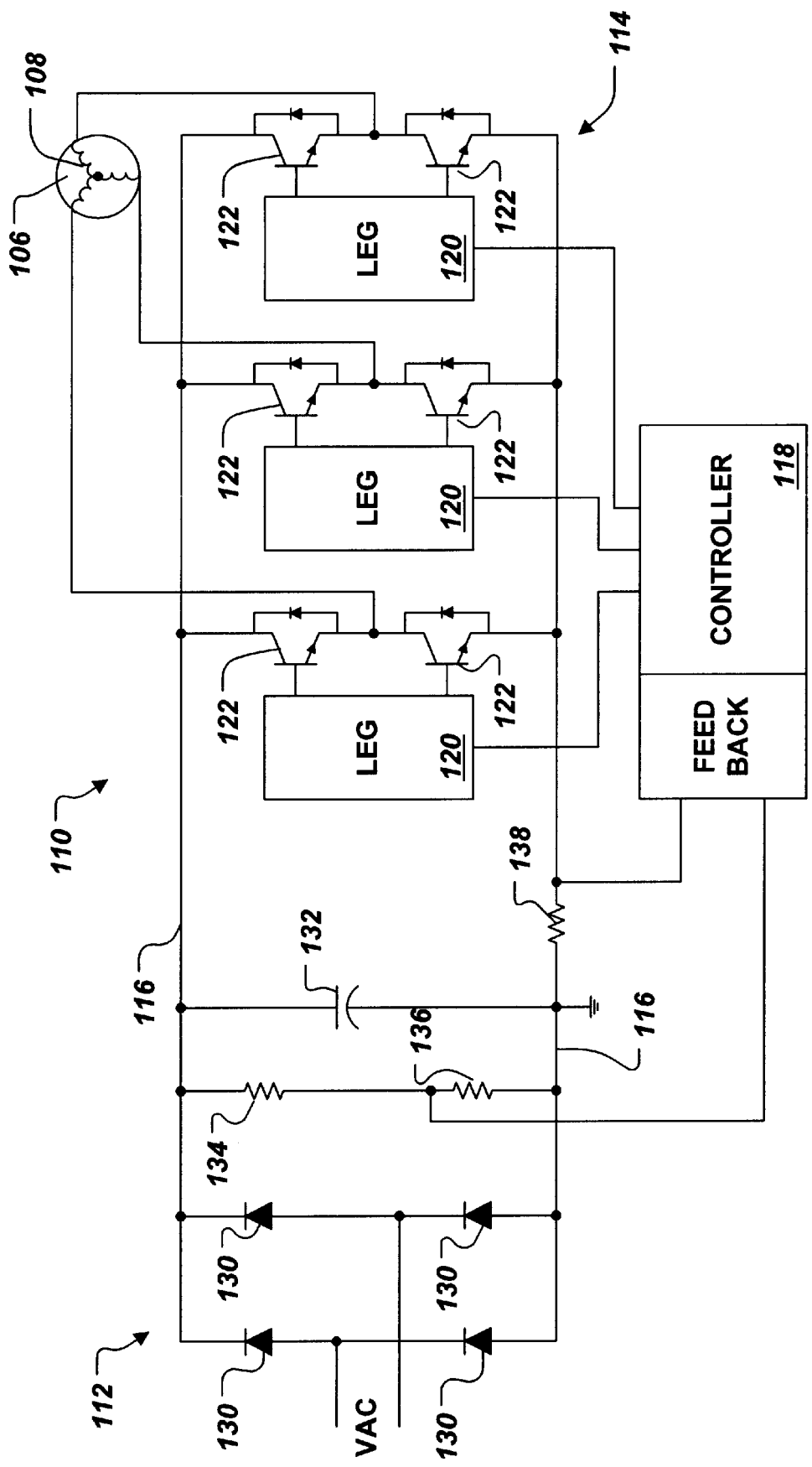
FIG. 4 is a schematic diagram of a clothes washing machine motor control system in accordance with an embodiment of the present invention.

The washing machine motor control system 110 is illustrated in further detail in FIG. 4. The three-phase inverter 114 includes three inverter legs 120, with each leg including inverter switching devices 122 connected in a bridge formation between the positive and negative lines of the DC bus 116. The switching devices 122 may comprise any suitable switching device, such as bi-polar devices, power metal-oxide semiconductor field effect transistors (MOSFETs), IGBTs, etc.

Each inverter leg 120 is connected to the controller 118, which is programmed to drive the switching devices so as to connect the power on the DC bus lines to the motor phases 108 in a desired pattern, such that AC output signals having the desired frequency and amplitude are synthesized from the DC power on the DC bus lines. In the illustrated embodiment, the controller 118 employs PWM for controlling the inverter switching devices 120. Further, each inverter leg 120 may employ additional hardware (not shown) for driving the switches 122. In a specific embodiment, IR2104 driver chips, available from International Rectifier are used for this purpose.

As shown in FIG. 4, the DC power source 112 comprises an AC to DC rectifier that receives an AC input voltage VAC, for example, 115 or 230 volts AC. The DC power source 112 includes rectifying diodes 130, a capacitor 132 connected such that the DC voltage source 112 provides a constant DC output on the DC bus 116 of approximately 160 volts DC for an input voltage of 115 volts AC, or approximately 320 volts DC for an input voltage of 230 volts AC. Resistors 134 and 136 provide a feedback signal to the controller 118 representing the voltage level of the DC bus 116 at any given time. A resistor 138 is connected in series with one line of the DC bus 116 to provide a feedback signal to the controller 118 representing the current flowing from the DC bus 116 through the motor 106 and back to the DC bus 116.

With a constant voltage DC bus 116 as illustrated in FIG. 4, the DC bus 116 current is indicative of the power delivered to the motor 106. Both motor power and slip increase as the load on the motor 106 increases. The system of the present invention uses this indication of power to adjust the output frequency of the inverter 114, thereby maintaining a desired speed as the load varies. The controller 118 is coupled to the DC bus 116 so as to receive a feedback signal indicating the DC bus 116 current. In the embodiment illustrated in FIG. 4, the DC bus 116 current is sensed by measuring the voltage drop across the resistor 138. The sensed voltage is amplified, peak detected, and routed to an analog to digital converter. A first-order low-pass filtering operation may further be performed on the sensed voltage value.

The controller 118 receives the digital value indicating the DC bus 116 current and uses it to determine an appropriate adjustment to the inverter output frequency. In one embodiment, the controller 118 is programmed to calculate a frequency adjustment $\Delta_{freq}$ according to $$\Delta_{freq} = I_{fb} * k$$

where $I_{fb}$ is the low-pass filtered value of the fed-back peak detected DC bus current, and k is a compensation constant. In a specific embodiment of the invention, the value of k was empirically determined by testing the washing machine 100 with varying loads in the wash basket 104.

In other embodiments, the controller 118 includes a memory storing a look-up table correlating a plurality of values for the frequency adjustment $\Delta_{freq}$ to corresponding DC bus current values. The sensed DC bus current $I_{fb}$ is then used to index the look-up table and determine the appropriate value of $\Delta_{freq}$ for the fed-back value of the DC link current $I_{fb}$.

In an exemplary implementation of the present invention, the washing machine motor 106 speed varies by 115 rpm from a nominal 1740 rpm if the compensation constant k is zero; however, with an appropriate value of the compensation constant k, the washing machine motor 106 speed remains constant within +/−10 rpm from light to heavy loads. In other embodiments of the invention, it is desirable to increase the washing machine motor 106 speed as the load increases. This is opposite the behavior that the washing machine 100 would exhibit if it were operated at a fixed inverter frequency. By increasing the value of the compensation constant k, the washing machine motor 106 can be made to go faster as the load increases. In specific embodiments of the invention, the voltage to frequency function of the inverter 114 output does not change as the output frequency is adjusted according to the sensed DC bus current.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of driving a clothes washing machine motor at a predetermined speed, the washing machine motor being powered by a DC to AC inverter that includes a DC bus providing an essentially constant DC voltage, the method comprising:
    measuring the DC bus current; and
    adjusting the inverter output frequency solely in response to the DC bus current measurement.

2. The method of claim 1, wherein measuring the DC bus current includes measuring the voltage drop across a resistor coupled to the DC bus.

3. The method of claim 2, wherein measuring the DC bus current further includes amplifying and peak detecting the measured voltage drop.

4. The method of claim 2, wherein measuring the DC bus current further includes converting the measured voltage to a digital value.

5. The method of claim 2, wherein measuring the DC bus current further includes low-pass filtering the measured voltage.

6. The method of claim 5, wherein adjusting the inverter output frequency includes multiplying the DC bus current by a compensation factor to calculate a frequency adjustment value.

7. The method of claim 1, wherein adjusting the inverter output frequency includes keeping the voltage to frequency function of the inverter output essentially constant.

8. The method of claim 1, wherein adjusting the inverter output frequency comprises increasing the inverter output frequency.

9. The method of claim 1, wherein adjusting the inverter output frequency includes calculating a frequency adjustment value by multiplying the measured DC bus current by a compensation factor.

10. The method of claim 1, wherein adjusting the inverter output frequency includes:
    calculating a plurality of inverter output frequency adjustment values corresponding to a plurality of DC bus current values;
    storing the inverter output frequency values and corresponding DC bus current values in a look-up table;
    indexing the look-up table according to the measured DC bus current to determine the inverter output frequency corresponding to the measured DC bus current.

11. The method of claim 1, wherein adjusting the inverter output frequency includes increasing washing machine motor speed when the DC bus current measurement indicates a load increase.

12. A program storage device storing instructions that when executed perform a method of driving a washing machine motor at a desired speed, the washing machine motor being powered by a DC to AC inverter that includes a DC bus providing an essentially constant DC voltage, the method comprising:

receiving an indication of the DC bus current; and determining an adjustment to the inverter output frequency solely in response to the indication of the DC bus current.

13. The program storage device of claim 12, wherein receiving an indication of the DC bus current comprises receiving an indication of the voltage drop across a resistor coupled to the DC bus, and wherein the executed method further comprises keeping the voltage to frequency function of the inverter output essentially constant.

14. The program storage device of claim 12, wherein determining an adjustment to the inverter output frequency further comprises multiplying the received DC bus current by a compensation factor.

15. The program storage device of claim 12, wherein the program storage device further stores a look-up table including a plurality of inverter output frequency adjustment values and corresponding DC bus current values, and wherein the executed method further comprises indexing the look-up table with the received indication of the DC bus current to determine the corresponding inverter output frequency adjustment value.

16. The method of claim 12, wherein determining an adjustment to the inverter output frequency includes increasing washing machine motor speed when the DC bus current measurement indicates a load increase.

* * * * *